United States Patent [19]
Reed

[11] 3,725,744
[45] Apr. 3, 1973

[54] ELECTRICAL COMPONENT CONNECTOR ASSEMBLY

[75] Inventor: Charles J. Reed, Boulder, Colo.

[73] Assignee: Ball Brothers Research Corporation, Boulder, Colo.

[22] Filed: June 11, 1971

[21] Appl. No.: 156,143

[52] U.S. Cl. .......................317/101 CC, 317/101 CE

[51] Int. Cl. ..........................................H05k 1/04

[58] Field of Search......339/18 C, 17 F; 317/101 CE, 317/101 CC, 101 DH, 101 CW; 174/68.5

[56] References Cited

UNITED STATES PATENTS

| | | | |
|---|---|---|---|
| 2,701,346 | 2/1955 | Powell | 339/18 C |
| 3,177,405 | 4/1965 | Gray | 317/101 CW |
| 3,061,182 | 10/1962 | Corrado et al. | 339/18 C |
| 3,223,216 | 12/1965 | Rub | 317/101 CE |
| 3,151,278 | 9/1964 | Elarde | 317/101 CW |
| 3,290,557 | 12/1966 | Ayer | 317/101 CW |
| 3,155,767 | 11/1964 | Schellack | 174/68.5 |

*Primary Examiner*—David Smith, Jr.
*Attorney*—Harris & O'Rourke

[57] ABSTRACT

An assembly for electrically connecting together various miniaturized electrical components is disclosed and generally includes a planer surface, such as a mother board, which supports the electrical components as well as at least one thin insulating strip lying in a plane extending perpendicular to the surface and defining a plurality of apertures arranged in accordance with a predetermined circuit plan. A plurality of spaced-apart electrically conductive posts and at least one electrically conductive rail are mounted on opposite sides of the insulating strip and extend in transverse directions so as to cross the aforesaid apertures in accordance with the predetermined plan. In this manner, preselected posts are welded to preselected rails through commonly crossed apertures, and are also electrically connected to the various electrical components which thereby connect these components together in accordance with the aforestated predetermined circuit plan.

4 Claims, 4 Drawing Figures

INVENTOR:
CHARLES J. REED

BY

Harris and O'Rourke

ATTORNEYS

INVENTOR.
CHARLES J. REED
BY
Harris and O'Rourke
ATTORNEYS

ELECTRICAL COMPONENT CONNECTOR ASSEMBLY

GOVERNMENT RIGHTS

The invention described herein was made in the performance of work under a NASA contract and is subject to the provisions of Section 305 of the National Aeronautics and Space Act of 1958, Public Law 85–568 (72 Stat. 435; 42 U.S.C. 2457).

BACKGROUND OF THE INVENTION

1. Field of the Invention

This invention relates generally to an electrical assembly and, more particularly to an electrical component connector assembly.

2. Description of the Prior Art

Where space is not at a premium, electrical components, especially the larger ones, such as relays, timers and the like, are generally mounted in a housed panel and intraconnected through terminal blocks also positioned therein. On the other hand, the smaller electronic components are usually mounted to a circuit board or mother board and, in many cases, are intraconnected by leads, particularly printed leads, extending across either side of the board.

In both of the above cited cases, where component density is low and where the number of components is small, the manner in which the components are arranged and intraconnected, is relatively simple. When, however, electronic component packages are used such as in a spacecraft, for example, or other environments where both space and weight are at a premium, it has been a common practice to modulize the components in a cordwood, flat-pack or integrated circuit fashion, or all three, so as to increase component density. This can mean, for example, as many as 300 to 400 components, which requires 300 to 400 potential intraconnections and as many or more leads must be positioned on the mother board which may be, for example, only 20 square inches in surface area.

Heretofore, modulizing a large number of electronic components in the aforestated fashions and supporting the same on a board defining a small area has not been very successful. One reason for this has been the inability to intraconnect the modulized components without otherwise appreciably increasing the space and/or weight of the overall circuit assembly.

While the prior art discloses various assemblies for intraconnecting electronic components, many of which include matrix-type designs, it has been found that these assemblies are too bulky, heavy and/or space consuming for the desired use as well as being inflexible in use and/or highly expensive to manufacture.

SUMMARY OF THE INVENTION

The aforestated deficiencies of the prior art, as well as other deficiencies thereof, have been overcome by the present invention, which provides means for intraconnecting electrical components in an economic and readily adaptable manner while minimizing both space and weight. Briefly, this has been achieved by providing a matrix fence assembly which constructed in accordance with the present invention and which generally comprises a support member constructed of electrical insulation material and defining as least two apertures extending transversly therethrough. At least one electrically conductive first lead and at least two electrically conductive second leads are mounted on opposite sides of the support member so as to extend across the apertures in a predetermined manner. In this way, the first lead may be welded to the second leads through the apertures for making electrical connection with one another.

Accordingly, an object of the present invention is to provide a new and improved electrical component connecting assembly which overcomes the aforestated deficiencies of the prior art.

Yet another object of the present invention is to provide an electrical component connecting assembly which is simple in design, readily adaptable in use and economical to manufacture.

Still another object of the present invention is to provide an assembly of the above-stated type which minimizes both the space and weight required for intraconnecting a large number of electrical components, especially modulized miniature electronic components.

Yet another object of the present invention is to provide a structure for intraconnecting a plurality of circuit board-mounted electrical components, the structure being in the form of a matrix fence so as to position most of the intraconnecting leads above the circuit board and in a plane extending perpendicular thereto.

A further object of the present invention is to provide a new and improved assembly for supporting and intraconnecting electronic components which utilizes a minimum amount of surface area for connecting the components and which is minimum in overall weight.

These and other objects and features of the present invention will become apparent from a reading of the following description.

DETAILED DESCRIPTION

Figure 1:
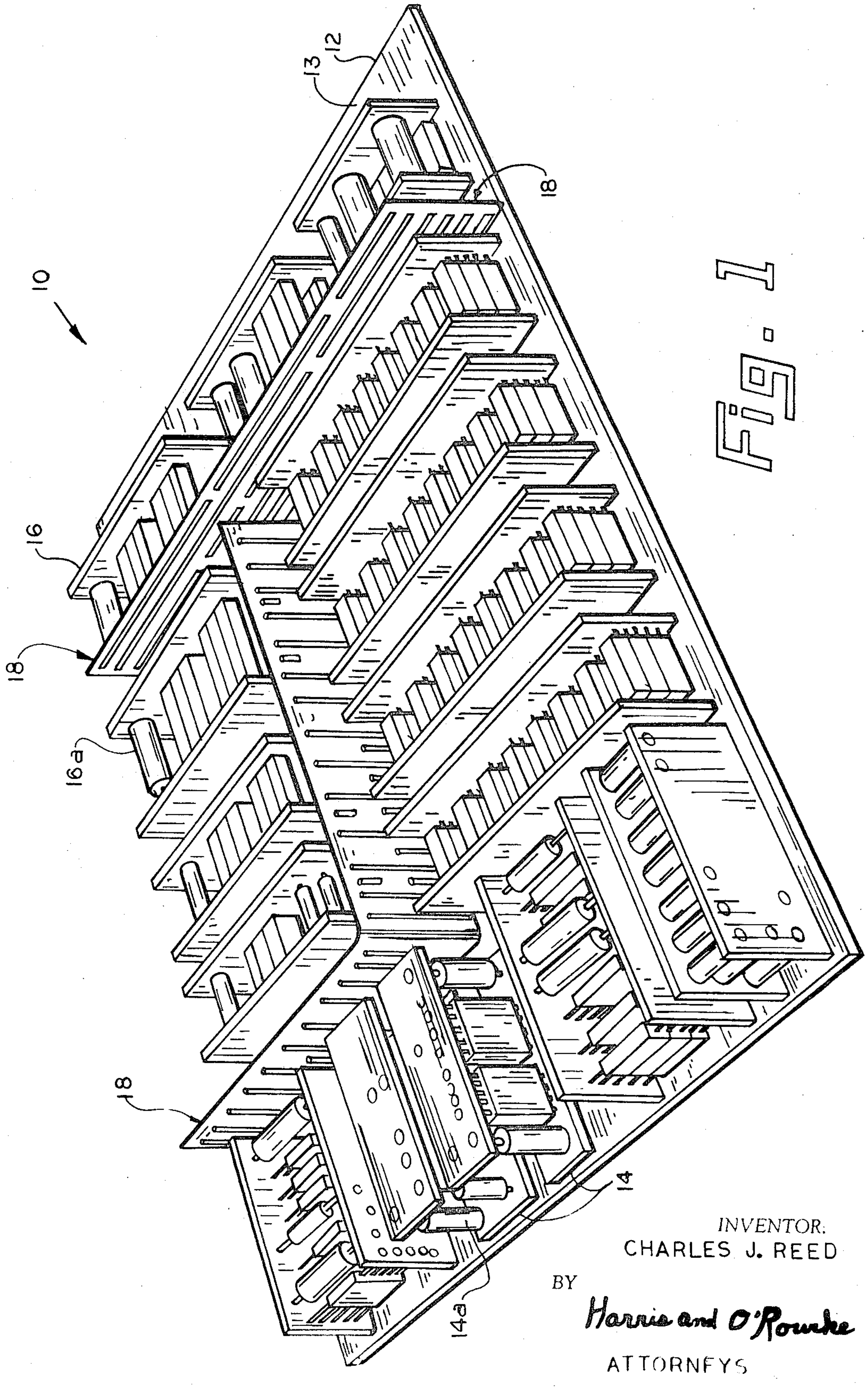
FIG. 1 is a perspective view of an electrical circuit assembly constructed in accordance with the present invention.

Turning now to the drawings, wherein like components are designated by like reference numerals throughout the various figures, an electrical circuit assembly 10, constructed in accordance with the present invention, is illustrated in FIG. 1 and includes a conventional mother board 12 having a planer surface 13 supporting a plurality of electronic components which may be modulized in, for example, both a cordwood and flat-pack fashion, as generally indicated by the reference numerals 14 and 16, respectively. The individual components making up the cordwood and flat-pack modules are intraconnected, in accordance with a predesigned circuit plan, by one or more component connecting structures 18, hereinafter referred to as matrix fence assemblies, as will be described in more detail below.

The matrix fence assemblies are fashioned as thin lightweight strips which are mounted to the planer surface 13 of mother board 12 in a plane extending perpendicular thereto. In this manner, both the weight of the entire electrical circuit assembly and the surface area of mother board 12 required for supporting and intraconnecting the electrical components are minimized, which is, of course, quite important where space and/or weight is at a premium.

To illustrate, at the outset, the importance of minimizing the surface area required to intraconnect the electrical components, attention is directed to FIG. 1 where mother board 12 is shown supporting approximately 15 modules, each of which includes approximately 20 to 25 electronic components. This means that there are approximately 300 to 375 components and therefore, as many or more leads intraconnecting the various components in accordance with the aforestated predesigned circuit plan. In addition, since planer surface 13 of mother board 12 defines a surface area of only approximately 20 square inches and since the modules 14 and 16 take up most of this area, as illustrated in FIG. 1, it is readily apparent that there is little room on the board to provide the required leads necessary for intraconnecting the components making up these modules. In this regard, it is to be noted that assembly 10 is not drawn to scale. For example, the thickness of matrix fence assemblies 18 is exaggerated for purposes of clarity.

It is to be understood that the types, size and number of modules recited above as well as the particular value attributed to the surface area of planer surface 13 are provided for exemplary purposes only, so as to illustrate the high density required in some intended applications, and are not intended to limit the present invention. In fact, the present invention contemplates utilizing a mother board of any desired surface area for supporting various kinds and any number of electrical components in any predetermined arrangement, the invention, however, being most useful where surface area and weight are critical factors.

Figure 2:
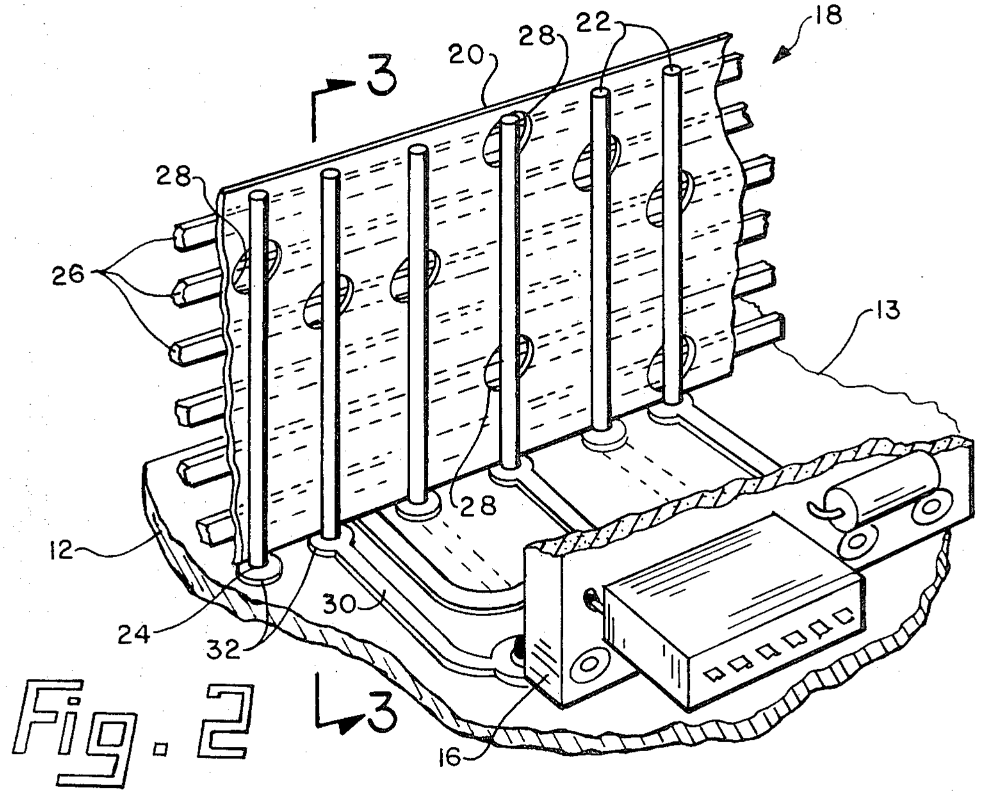
FIG. 2 is an enlarged broken away perspective view of a matrix fence assembly utilized in the assembly of FIG. 1 for electrically intraconnecting the various electrical components provided therewith.
Figure 3:
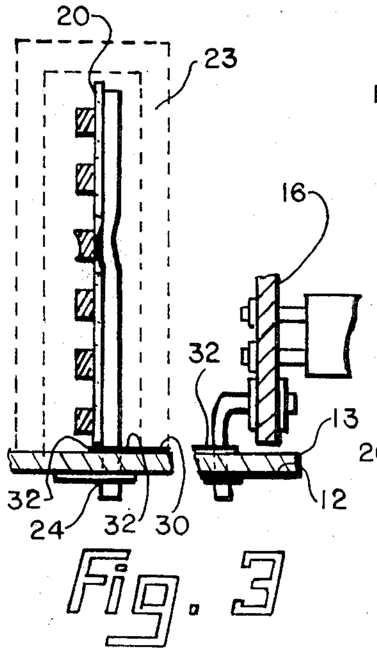
FIG. 3 is a broken away cross-sectional view taken generally along line 3—3 in FIG. 2.

Turning to FIGS. 2 and 3, attention is now directed to an enlarged nonscaled view of one of the matrix fence assemblies 18, which is constructed in accordance with the present invention and which includes an elongated rectangular support member 20 preferably constructed of a strip of insulation material such as, for example, 0.007-inch thick double-matted Mylar (polyethylene terephthalate). By providing this thin but double-matted strip of Mylar, support member 20 displays a certain amount of rigidity and yet is sufficiently flexible so as to be easily deformed without fear of breakage. Thus, the support member, which is positioned on planer surface 13 so as to extend upwardly therefrom and perpendicular thereto, may be transversely deformed for displaying, for example, a right angle (as illustrated in FIG. 1). In this manner, the support member is readily adaptable for use with a circuit board displaying electrical components prearranged in any fashion.

Matrix fence assembly 18 further includes a plurality of longitudinally spaced-apart electrically conductive leads or posts 22, which are supported to one side of member 20 in a manner to be described below and which extend upwardly in a direction perpendicular to planer surface 13. As illustrated best in FIG. 3, the posts extend downwardly beyond the lower longitudinal edge of support member 20 through cooperating apertures 24 provided in the mother board and terminate just below the bottom surface thereof. In this manner, the posts, not only aid in supporting member 20 to mother board 12 but also, as will be seen hereinafter, may be connected to the various electrical components by relatively short leads provided on either side of the mother board.

In addition to posts 22, assembly 18 includes a plurality of vertically spaced electrically conductive leads or rails 26, which are supported to the opposite side of support member 20 in a manner to be described hereinafter and which extend in a direction perpendicular to and which cross posts 22 so as to form a matrix design.

While the posts and rails may be constructed of any suitable electrically conductive material, they are preferably constructed of 0.020-inch diameter nickel wires and 0.010-inch thick by 0.020-inch wide nickel ribbon, respectively. In this manner, the posts and rails are rigid enough to hold support member 20 in an erect position and yet flexible enough so as to deform or bend along with the support member. Also, it should be noted that the support member 20, in accordance with the previously recited preferred construction, is thinner than either the posts or rails, which, in turn, indicates the extreme thinness of the overall matrix fence assembly. In this regard, when the posts and rails are connected together in a manner to be described below, the entire matrix fence assembly may be placed within a U-shaped insulation channel 23, indicated by dotted lines in FIG. 3, which channel is constructed of, for example, fiberglass epoxy and thereafter potted with epoxy so as to further add to the rigidity of the assembly.

A plurality of apertures 28 are provided transversely through support member 20 and are arranged so as to electrically connect predetermined posts to predetermined rails in accordance with a predesigned circuit plan. In this regard, each aperture is positioned at the junction or crossing point of a predetermined post and a predetermined rail, as illustrated in FIG. 2, so that the latter two may be electrically connected together through the aperture. This is preferably accomplished by means of resistance welding, the nickel wire and ribbon being well suited for this purpose.

In accordance with the present invention, by connecting the posts to the rails in the above manner, the welded sections fix the posts and rails to support member 20 while eliminating the need for separate connecting means between the posts and rails, which separate means would otherwise require twice the number of connecting junctions and thereby add time and expense in the manufacture of matrix fence assembly 18 as well as to increase the possibility of malfunction due to the additional connecting junctions.

As illustrated in FIGS. 2 and 3, various predetermined electrical components making up cordwood and flat-pack modules 14 and 16, respectively, are electrically connected to predetermined posts 22 by leads 30, preferably printed circuit board leads, extending from the components along either side of mother board 12 and terminating at conventional conductive pads 32 which circumscribe the post-receiving apertures 24 on either side of mother board 12 and which engage the posts inserted therein. In this manner, it is readily apparent that the various electrical components, such as the one designated by the reference numeral 14*a* (FIG. 1) may be electrically connected to other components, such as the one designated by the reference numeral 16*a*, by utilizing an extremely small amount of space on the mother board even though the components are spaced a relatively large distance from one another. This, of course, is extremely important when considering the vast number of such intraconnections which must be made in a relatively small area, as illustrated in FIG. 1.

It is to be noted that the matrix fence assembly 18, illustrated in FIGS. 2 and 3, displays a true or balanced matrix, that is, all of the posts 22 are equally spaced apart and transversely extend entirely across one side of support member 20 and all of the rails 26 are, in like manner, equally spaced apart and longitudinally extend entirely across the opposite side of the support member. In actual practice, however, the matrix fence assembly does not have to display a balance matrix, but rather, may be predesigned and constructed for use with a specific circuit. This is illustrated best in FIG. 4, which displays a modified matrix fence assembly 18*a* including a support member 20*a* and prearranged apertures 28*a* identical to previously described support member 20 and apertures 28, respectively.

Figure 4:
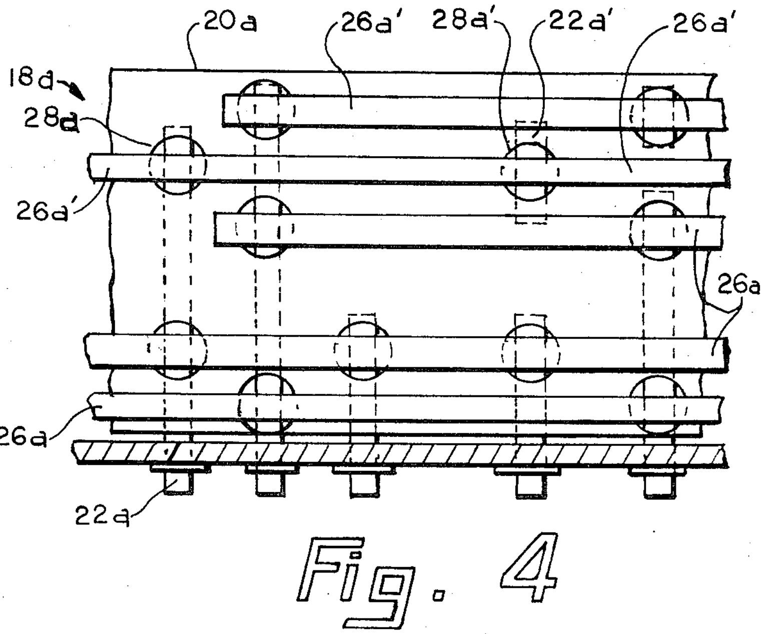
FIG. 4 is a broken away rear view of a second embodiment of the matrix fence assembly.

However, as noted in FIG. 4, the posts and rails, generally designated by the reference numerals 22*a* and 26*a*, respectively, do not form a true matrix. Instead, they are of varying predetermined lengths and are positioned, only where necessary, on support member 20*a* so as to cross apertures 28*a* where they can be electrically connected together in the manner described hereinabove. In this regard, where there is a large distance between two adjacent posts which are welded to a particular rail, such as the rail designated by the reference numeral 26*a'*, a relatively short support member 22*a'*, constructed of the same material as posts 22*a*, is mounted to the support member 20*a* on the opposite side as rail 26*a'* and across an aperture 28*a'* provided through the support member. In this manner, the member 22*a'* may be welded to the rail 26*a'* through the aperture so as to anchor-weld the latter in place.

As illustrated in FIG. 4, the plurality of posts and plurality of rails are not necessary equally spaced apart. HOwever, they are spaced a sufficient distance so as to prevent electrical interference therebetween, and the posts, in particular, are spaced at intervals sufficient to allow typical printed circuit board leads to extend therebetween. In this manner, the matrix fence assembly does not restrict the use of these typical circuit board leads where necessary.

In providing a modified matrix design, that is, a design displaying posts and rails only where necessary such as in FIG. 4, it is readily apparent that both time and cost is minimized in the construction of the matrix fence assembly. In this regard, the matrix fence assembly of FIG. 4 is preferably designed by initially computing the number of required intraconnections between the various particular modules making up the predesigned circuit. This may be done in any manner, but is preferably accomplished by graphically displaying the various modules in a row and column and thereafter representing the different intraconnections by marks such as dots. In this manner, those modules requiring the largest number of intraconnections may be determined and positioned adjacent each other, both graphically (on paper) and physically (on the mother board). Therefore, the number of posts and rails as well as the number of and overall lengths of the entire matrix fence assemblies may be minimized. In addition, the graphic representation of each matrix fence assembly readily displays the positioning of the posts, rails and apertures so as to facilitate construction thereof.

Although two embodiments of the present invention have been illustrated and described, it is anticipated that various changes and modifications will be apparent to those skilled in the art, and that such changes may be made without departing from the scope of the invention as defined by the following claims.

What is claimed is:

1. A structure for selectively connecting together a plurality of circuit board-mounted electrical components in accordance with a predetermined circuit plan, said structure comprising: a thin support strip constructed of electrical insulation material and having apertures defined therein, said support strip being mounted along one edge to one side of the circuit board so as to extend in a plane substantially perpendicular thereto with substantially said entire one edge being in engagement with said circuit board; a plurality of first electrically conductive leads mounted to one side of said support strip, spaced apart from one another and extending along said support strip; and a plurality of second electrically conductive leads mounted to the opposite side of said support strip, spaced apart from one another and extending in a direction transverse to at least some of said first leads, predetermined ones of said second leads being in direct electrical contact with predetermined ones of said first leads through said apertures in said support strip and in accordance with said predetermined circuit plan.

2. A structure according to claim 1 including a protective insulation housing of substantially U-shaped configuration positioned about substantially all of said support strip and leads mounted thereto and wherein said second leads extend out from said housing.

3. An electrical circuit assembly comprising: a component supporting board constructed of insulating material; a plurality of electrical components making up a predetermined electrical circuit mounted to and extending outwardly from one side of said board; at least one elongated thin support strip constructed of insulation material, mounted along one edge to and extending outwardly from said one side of said board in a plane substantially perpendicular to said board, said support strip being in engagement with said board along substantially said entire one edge of said support strip and having portions extending between predetermined ones of said plurality of electrical components extending outwardly from said one side of said board, said support strip also including means defining a plurality of apertures therethrough; a plurality of first electrcially conductive leads mounted to one side of said support strip, spaced apart from one another and extending in a direction substantially parallel with said board; a plurality of second electrically conductive leads mounted to the opposite side of said support strip, spaced apart from one another and extending from at least one surface of said board in a direction substantially perpendicualr to said first leads and crossing various ones thereof, predetermined ones of said second leads being directly connected to predetermined ones of said first leads through said apertures in said support strip in accordance with said predetermined circuit; and means for electrically connecting various ones of said electrical components to various ones of said second leads in accordance with said predetermined circuit.

4. An assembly according to claim 3 wherein said plurality of electrical components are separated into groups, each of which comprises a module making up a portion of said predetermined electrical circuit, said modules extending outwardly from said one side of said board on opposite sides of at least a portion of said support strip.

* * * * *